United States Patent [19]
Maeda et al.

[11] Patent Number: 5,821,320
[45] Date of Patent: Oct. 13, 1998

[54] METHOD OF PRODUCING THE AROMATIC POLYIMIDE

[75] Inventors: Masatoshi Maeda; Kenichi Ikeda, both of Osaka, Japan

[73] Assignee: Petroleum Energy Center, Tokyo, Japan

[21] Appl. No.: 856,542

[22] Filed: May 15, 1997

[30] Foreign Application Priority Data

May 21, 1996 [JP] Japan ..................................... 8-126158

[51] Int. Cl.$^6$ ........................... C08G 73/10; C08G 69/26
[52] U.S. Cl. .................... 528/173; 528/125; 528/128; 528/172; 528/174; 528/220; 528/229; 528/271; 528/272; 528/310; 528/332; 528/335; 528/336; 528/350; 528/353
[58] Field of Search ..................... 528/353, 332, 528/310, 335, 336, 350, 220, 229, 172, 173, 271, 272, 174, 125, 128

[56] References Cited

U.S. PATENT DOCUMENTS 5,420,232  5/1995  Dawson et al. ........................ 528/350

OTHER PUBLICATIONS

D. Wilson, et al. (ed.), *Polyimides*, Blackie & Son, Ltd., p. 32, 1990.

*Primary Examiner*—P. Hampton-Hightower
*Attorney, Agent, or Firm*—Merchant, Gould, Smith, Edell, Welter & Schmidt, P.A.

[57] ABSTRACT

18.4 grams of 4,4'-(hexafluoroisopropyridine)diphthalic acid dianhydride and 7.5 grams of 1,4-phenylenediamine dihydrochloride are mixed in a solvent consisting of 80 ml of N-methyl-2-pyrrolidone and 20 ml of dichlorobenzene and are heated at an argon atmosphere to raise its temperature from a room temperature to 170° C. slowly and to be reacted for five hours while an azeotropic dihydration of water which is generated at 170° C. is conducted. After the reaction is completed, a reaction product is precipitated in methanol, the precipitate is washed with methanol and dried at 80° C. FIG. 1 shows the infrared spectra of the reaction product.

19 Claims, 2 Drawing Sheets

METHOD OF PRODUCING THE AROMATIC POLYIMIDE

FIELD OF THE INVENTION

The present invention relates to a method of producing aromatic polyimide, and particularly relates to a one-step method of producing aromatic polyimide using inexpensive starting material, which method requires only a short reaction time.

BACKGROUND OF THE INVENTION

Conventionally, aromatic polyimide has some excellent characteristics such as electrical insulating property, heat-resistance, selective permeability, solvent-resistance and dimensional stability of the product made of aromatic polyimide. Therefore, aromatic polyimide has been employed widely in the electrical industrial field, the electronic industrial field and the chemical field. Particularly, soluble polyimide has been mainly employed since soluble polyimide can be easily formed and processed. In general, the soluble polyimide is synthesized by a chemical imidation method or a thermal imidation method.

As shown in the following Chemical Formula 4, the chemical imidation method generally consists of two steps. In a first step, an addition polymerization reaction is carried out between an acid dianyhydride and diamine to produce polyamic acid. In a second step, a dehydration agent such as an acetic anhydride or a trifluoroacetic anhydride, or a catalyst such as pyridine or triethylamine is employed as an imide cyclization agent to obtain polyimide. (In the Chemical Formula 4, R represents a tetravalent organic group, Ar represents an organic group having at least one aromatic ring and n represents a positive integer.)

Chemical Formula 4

As shown in following Chemical Formula 5, the conventional thermal imidation method generally consists of two steps. A first step is same as that of the chemical imidation method. In a second step, at a temperature of about 120° C., in the presence of a catalyst such as p-toluenesulfonate hydrate, a dehydration reaction is carried out using an azeotropic dehydration solvent, a dehydration agent or a dehydration trapping agent, and an imide cyclization reaction is conducted so as to obtain the polyimide. (In the Chemical Formula 5, R represents a tetravalent organic group, Ar represents an organic group having at least one aromatic ring and n represents a positive integer.)

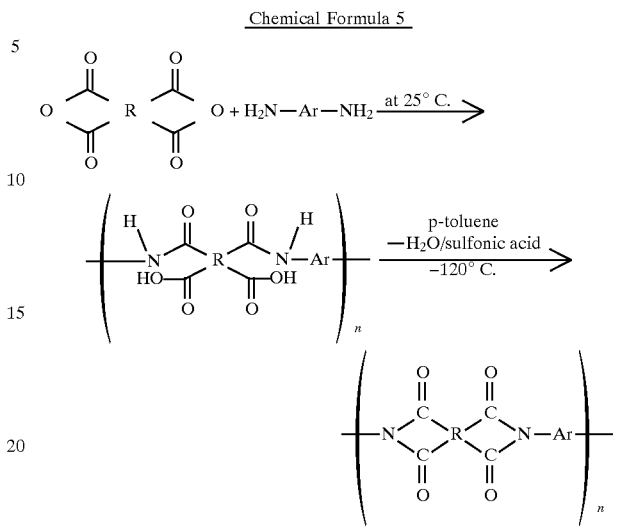

Chemical Formula 5

According to the above-mentioned conventional methods of producing aromatic polyimide, starting material is expensive. Further, it takes a long time to accomplish the series of the processes, more than 24 hours, and generally at least 48 hours. In addition, the the above-mentioned conventional methods are not useful for production of large quantities of aromatic polyimide, since they consist of two steps, therefore it takes a long time to produce aromatic polyimide. In addition, using the above-mentioned conventional methods, the polymerization degree of the obtained aromatic polyimide can not be increased.

SUMMARY OF THE INVENTION

This invention provides a method of producing aromatic polyimide having a high polymerization degree using an inexpensive starting material in a one-step method with a short reaction time as compared with conventional methods.

In order to solve the above-mentioned problems of the conventional method, an examination has been conducted. As a result, a method of synthesizing aromatic polyimide having a high molecular weight (high degree of polymerization) was determined. The method of producing aromatic polyimide having a high molecular weight of the invention includes using a diamine dihydrochloride or diamine sulfate as starting material for the diamine component of aromatic polyimide. The starting material is combined with an acid anhydride in a suitable solvent and heated. The above-mentioned procedures produced aromatic polyimide having a high molecular weight by dehydrating and condensing the diamine component of the diamine dihydrochloride or the diamine sulfate with the acid anhydride during a short reaction time, less than 24 hours, and preferably about 3 to 5 hours.

That is, the method of producing the aromatic polyimide of this invention includes combining an acid dianhydride with a diamine dihydrochloride (as shown by the above-mentioned Chemical Formula 1) or with a diamine sulfate (as shown by the above-mentioned Chemical Formula 2) in a solvent, and heating the solvent. The above-mentioned procedures produced aromatic polyimide comprising a repeating unit expressed by the above-mentioned Chemical Formula 3 by dehydrating and condensing the diamine component of the diamine dihydrochloride or the diamine sulfate with the acid anhydride.

A diamine dihydrochloride starting material is prepared by dissolving the diamine in water, an organic solvent, or a mixture of water and an organic solvent. The dissolved diamine is neutralized with concentrated sulphuric acid or excess hydrochloric acid gas and the dissolved diamine is dehydrated or solvent removed. A diamine sulfate starting material is prepared by dissolving diamine in water, an organic solvent, or a mixture of water and the organic solvent. The dissolved diamine is neutralized with concentrated sulphuric acid or excess hydrochloric acid gas, and the dissolved diamine is dehydrated or solvent removed.

A diamine dihydrochloride useful in the method of the invention includes, for example, 1,4-phenylenediamine dihydrochloride, 5-chloro-m-phenylenediamine dihydrochloride, 3,5-diamino dihydrochloride benzoate, 1,3-phenylenediamine dihydrochloride, 2,4-diaminotoluene dihydrochloride, 2,5-diaminotoluene dihydrochloride, 2,6-diaminotoluene dihydrochloride, 1,3-diamino-4-nitrobenzene dihydrochloride, m-phenylenediamine-4-sulfonic acid dihydrochloride, 2,5-dimethyl-p-phenylenediamine dihydrochloride, 2,4,6-trimethyl-1,3-phenylenediamine dihydrochloride, 2,3,5,6-tetramethyl-1,4-phenylenediamine dihydrochloride, 1,5-naphthalenediamine dihydrochloride, bis(4-(4-aminophenoxy)phenyl)sulfonic acid dihydrochloride, bis(3-aminophenyl)sulfonic acid dihydrochloride, α,α'-bis(4-aminophenyl)-1,4-diisopropylbenzene dihydrochloride, 4,4'-diaminodiphenyl ether dihydrochloride, 3,4'-diaminodiphenyl ether dihydrochloride, 2,2-bis(4-(4-aminophenoxy)phenyl) hexafluoropropane dihydrochloride, 2,2-bis(4-(4-aminophenoxy)phenyl)propane dihydrochloride, 3,3'-dihydroxy-4,4'-diaminobiphenyl dihydrochloride, 2,2'-dimethyl-4,4'-diaminobiphenyl dihydrochloride, 3,3'-dimethyl-4,4'-diaminobiphenyl dihydrochloride, 2,2-bis(3-amino-4-methylphenyl) hexafluoropropane dihydrochloride, 3,3'-diaminobenzophenone dihydrochloride, 9,9'-bis(4-aminophenyl) fluorene dihydrochloride, 4,4'-bis(4-aminophenoxy) biphenyl dihydrochloride, 1,4'-bis(4-aminophenoxy) benzene dihydrochloride, 4,4'-diaminobenzanilide dihydrochloride, 2,2-bis (3-amino-4-hydroxyphenyl) hexafluoropropane dihydrochloride, 2,5-diethoxy-p-phenylenediamine dihydrochloride, 4,4'-diaminophenyl sulfonic acid dihydrochloride, 4,4'-diaminodiphenylsulfide dihydrochloride, 4,4'-diaminodiphenyl sulfonic acid dihydrochloride, 4,4'-methylene-bis (2-chloroaniline) dihydrochloride, bis(4-(3-aminophenoxy)phenyl) sulfonic acid dihydrochloride, 1,3-bis(4-aminophenoxy)benzene dihydrochloride, 2,2'-bis(trifluoromethyl)benzidine dihydrochloride, 2,2'5,5'-tetrachloro-4,4'-diaminobiphenyl dihydrochloride, 3,7'-diamino-2,8-dimethylbenzothiophene sulfonic acid dihydrochloride, 1,4-bis(4-aminophenoxy)-2-phenylbenzene dihydrochloride, neopentyl glycol-di-4-aminophenyl ether dihydrochloride, 2,4-diaminophenol dihydrochloride, 2,4-diaminoanisole dihydrochloride, 2,4-diaminodiphenyl ether dihydrochloride, m-xylenediamine dihydrochloride, 1,3-bis(m-aminophenoxy)benzene dihydrochloride, 3,3'-dichloro-4,4'-diaminobiphenyl dihydrochloride, 3,3'-dimethoxy-4,4'-diaminobiphenyl dihydrochloride, 4-chloro-m-phenylenediamine dihydrochloride, 3,3'-dimethyl-4,4'-diaminobiphenyl-6,6'-disulfonic acid dihydrochloride, 4,6-diaminoresorcinol dihydrochloride, 2,2'-diaminodiphenyl sulfide dihydrochloride, 4,4'-diaminodiphenyl sulfide dihydrochloride, 4,4'-diaminodiphenylmethane dihydrochloride, 3,4'-diaminodiphenylmethane dihydrochloride, 3,3'-diaminodiphenylmethane dihydrochloride, 4,4'-diamino-3,3'-dimethyldi-phenylmethane dihydrochloride, 3,3',5,5'-tetramethylbenzidine dihydrochloride, 3,3'-diamino-4,4'-dihydroxy biphenyl dihydrochloride, 4,4'-diamino-1,2-diphhenylethane dihydrochloride, n-butylene glycol-di-4-aminophenyl ether dihydrochloride, n-pentyl glycol-di-4-aminophenyl ether dihydrochloride, 2-chloro-5-methyl-p-phenylenediamine dihydrochloride, 2,7-diaminofluorene dihydrochloride, 1,4-diamino anthraquinone dihydrochloride, 4,4'-diaminobenzophenone dihydrochloride, 2,2-bis(3-aminophenyl)hexafluoropropane dihydrochloride, 2,2-bis(4-aminophenyl)hexafluoropropane dihydrochloride, 4,4'-diamino octafluorobiphenyl dihydrochloride, 3,3'-diethylbenzidine dihydrochloride, 1,5-diamino anthraquinone dihydrochloride, 2-(trifluoromethyl)-1,4-phenylenediamine dihydrochloride, 2-chloro-p-pnehylenediamine dihydrochloride, 1,4-diamino-2-fluorobenzene dihydrochloride, 1,4-diaminotetrafluorobenzene dihydrochloride, 1,4-diamino-2,5-bis(trifluoromethyl)benzene dihydrochloride, 3,3'-bis(trifluoromethyl)benzidine dihydrochloride, 2-(trifluoromethyl)-1,4-phenylenediamine dihydrochloride, 4-trifluoromethyl-1,4-phenylenediamine dihydrochloride, heptafluoro isopropyl-2,4-diaminobenzene dihydrochloride, 4,4'-difluoro-3,3'-diaminodiphenyl sulfonic acid dihydrochloride, 1,5-difluoro-2,4-diaminobenzene dihydrochloride, 2,3-dimethyl-p-phenylenediamine dihydrochloride, 4,4'-diamino-p-terphenyl dihydrochloride and 3,5-diamino-2-methyl dihydrochloride benzoate. They may be used individually or as a mixture of two or more.

A diamine sulfate useful in the method of the invention includes, for example, 1,4-phenylenediamine sulfate, 5-chloro-m-phenylenediamine sulfate, 3,5-diamino sulfate benzoate, 1,3-phenylenediamine sulfate, 2,4-diaminotoluene sulfate, 2,5-diaminotoluene sulfate, 2,6-diaminotoluene sulfate, 1,3-diamino-4-nitrobenzene sulfate, m-phenylenediamine-4-sulfonic acid sulfate, 2,5-dimethyl-p-phenylenediamine sulfate, 2,4,6-trimethyl-1,3-phenylenediamine sulfate, 2,3,5,6-tetramethyl-1,4-phenylenediamine sulfate, 1,5-naphthalenediamine sulfate, bis(4-(4-aminophenoxy)phenyl)sulfonic acid sulfate, bis(3-aminophenyl)sulfonic acid sulfate, α,α'-bis(4-aminophenyl)-1,4-diisopropylbenzene sulfate, 4,4'-diaminodiphenyl ether sulfate, 3,4'-diaminodiphenyl ether sulfate, 2,2-bis(4-(4-aminophenoxy)phenyl) hexafluoropropane sulfate, 2,2-bis(4-(4-aminophenoxy)phenyl)propane sulfate, 3,3'-dihydroxy-4,4'-diaminobiphenyl sulfate, 2,2'-dimethyl-4,4'-diaminobiphenyl sulfate, 3,3'-dimethyl-4,4'-diaminobiphenyl sulfate, 2,2-bis(3-amino-4-methylphenyl) hexafluoropropane sulfate, 3,3'-diaminobenzophenone sulfate, 9,9'-bis(4-aminophenyl)fluorene sulfate, 4,4'-bis(4-aminophenoxy)biphenyl sulfate, 1,4-bis(4-aminophenoxy)benzene sulfate, 4,4'-diaminobenzanilide sulfate, 2,2'-bis(3-amino-4-hydroxyphenyl)hexafluoropropane sulfate, 2,5-diethoxy-p-phenylene diamine sulfate, 4,4'-diaminodiphenyl sulfonic acid sulfate, 4,4'-diaminodiphenyl sulfide sulate, 4,4'-methylene-bis(2-chloroaniline)sulfate, bis(4-(3-aminophenoxy)phenyl)sulfonic acid sulfate, 1,3-bis (4-aminophenoxy)benzene sulfate, 2,2'-bis(trifluoromethyl) benzidine sulfate, 2,2',5,5'-tetrachloro-4,4'-diaminobiphenyl sulfate, 3,7'-diamino-2,8-dimethyl benzothiofene sulfonic acid sulfate, 1,4-bis(4-aminophenoxy)-2-phenylbenzene sulfate, neopentyl glycol-di-4-aminophenyl ether sulfate, 2,4-diaminophenol sulfate, 2,4-diamino anisole sulfate, 2,4-diaminodiphenyl ether sulfate, m-xylene diamine sulfate, 1,3-bis(m-aminophenoxy)benzene sulfate, 3,3'-dichloro-4, 4'-diaminobiphenyl sulfate, 3,3'-dimethoxy-4,4' diamino biphenyl sulfate, 4-chloro-m-phenylenediamine sulfate, 3,3'-dimethyl-4,4'-diaminobiphenyl-6,6'-disulfonic acid sulfate, 4,6-diaminoresocinol sulfate, 2,2'-diaminodiphenyl sulfide sulfate, 4,4'-diaminodiphenyl sulfide sulfate, 4,4'-diaminodiphenyl methane sulfate, 3,4'-diaminodiphenyl methane sulfate, 3,3'-diaminodiphenyl methane sulfate, 4,4'-diamino-3,3'-dimethylphenyl methane sulfate, 3,3',5,5'-tetramethylbenzidine sulfate, 3,3'-diamino-4,4'-dihydroxy biphenyl sulfate, 4,4'-diamino-1,2-diphenylethane sulfate, n-butylene glycol-di-4-aminophenyl ether sulfate, n-petyl glycol-di-4-aminophenyl ether sulfate, 2-chloro-5-methyl-p-phenylenediamine sulfate, 2,7-diaminofluorene sulfate, 1,4-diaminoanthraquinone sulfate, 4,4'-diaminobenzophenone sulfate, 2,2-bis(3-aminophenyl) hexafluoropropane sulfate, 2,2-bis(4-aminophenyl) hexafluoropropane sulfate, 4,4'-diamino octafluorobiphenyl sulfate, 3,3'-diethylbenzidine sulfate, 1,5-diaminoanthraquinone sulfate, 2-(trifluromethyl)-1,4-phenylenediamine sulfate, 2-chloro-p-phenylenediamine sulfate, 1,4-diamino-2-fluorobenzene sulfate, 1,4-diaminotetrafluorobenzene sulfate, 1,4-diamino-2,5-bis (trifluoromethyl)benzene sulfate, 3,3'-bis(trifluoromethyl) benzidine sulfate, 2-trifluoromethyl-1,4-phenylenediamine sulfate, 4-trifluoromethyl-1,4-phenylenediamine sulfate, heptafluoroisopropyl-2,4-diaminobenzene sulfate, 4,4'-difluoro- 3,3-diaminodiphenyl sulfonic acid sulfate, 1,5-difluoro-2,4-diaminobenzene sulfate, 2,3-dimethyl-p-phenylenediamine sulfate, 4,4'-diamino-p-terphenyl sulfate and 3,5-diamino-2-methyl-sulfate benzoate. They may be used individually or as a mixture of two or more.

An acid dianhydride useful in the method of the invention includes, for example, pyromellitic acid dianhydride, 4, 4'-oxidiphthalic acid dianhydride, 3,3',4,4'-biphenyltetra carboxylic acid dianhydride, 3,3',4,4'-benzophenonetetra carboxylic acid dianhydride, 4,4'-(hexafluoroisopropylidene) diphthalic acid dianhydride, 3,3',4,4'-diphenylsulfonetetra carboxylic acid dianhydride, naphthalene-1,4, 5,8-tetra carboxylic acid dianhydride and 3,4,9,10-perylenetetra carboxylic acid dianhydride. They may be used individually or as a mixture of two or more.

The diamine dihydrochloride or the diamine sulfate is mixed with an acid dianhydride at mole ratio of 1:1 in a suitable solvent and heated. As a result, aromatic polyimide is produced by dehydrating and condensing the diamine component of the diamine dihydrochloride or the diamine sulfate with the acid dianhydride.

A suitable solvent useful in the method of the invention includes, for example, a synthetic solvent such as N-methyl-2-pyrrolidone, N,N-dimethylformamide, N,N-dimethylacetoamide, dimethylsulfoxide and hexamethylphosphoramide. Particularly, it is preferred that the solvent include one or a mixture of two or more kinds of solvents selected from xylene, chlorobenzene, dichlorobenzene and trichlorobenzene. These solvents are useful as an azeotropic solvent for dehydration and are useful to conduct a dehydration reaction (dehydration and condensation reaction) efficiently. The choice of suitable azeotropic solvent used will depend on the synthesis temperature, the kind of the additional synthetic solvent in the mixture. Depending on the kinds of the acid dianhydride, the diamine dihydrochloride or the diamine sulfate and the solvent to be used, the reacting temperature is determined appropriately. In general, the reacting temperature for producing the aromatic polyimide is in a range between 140° C. and 200° C. Particularly, it is preferred that the range of the reacting temperature for producing the aromatic polyimide is between 160° C. and 170° C. The reaction time needed is less than that required by the conventional methods. It is efficient that the reacting time is about three to about five hours. Accordingly, using the method of the invention, an aromatic polyimide having a high polymerization degree (molecular weight) and more than 0.6 (dL/g) of intrinsic viscosity, which could not be obtained by conventional producing methods, is synthesized.

According to this invention, an aromatic polyimide, having a higher polymerization degree (high molecular weight) and greated intrinsic viscosity than that which was obtained by conventional producing methods, can be obtained by conducting only one reaction process and for a short time such as three to five hours. The aromatic polyimide produced by the method of the invention is useful for producing articles of manufacture, such as high elastic fiber, heat-stable film, heat-stable adhesive, permselective membrane and photoresist.

DETAILED DESCRIPTION OF THE INVENTION

Hereinafter, more details of this invention will be explained referring to specific embodiments, however, this invention is not limited to these embodiments.

EXAMPLE 1

Production of Polyimide From Diamine Dihydrochloride and Acid Anhydride

Figure 1:
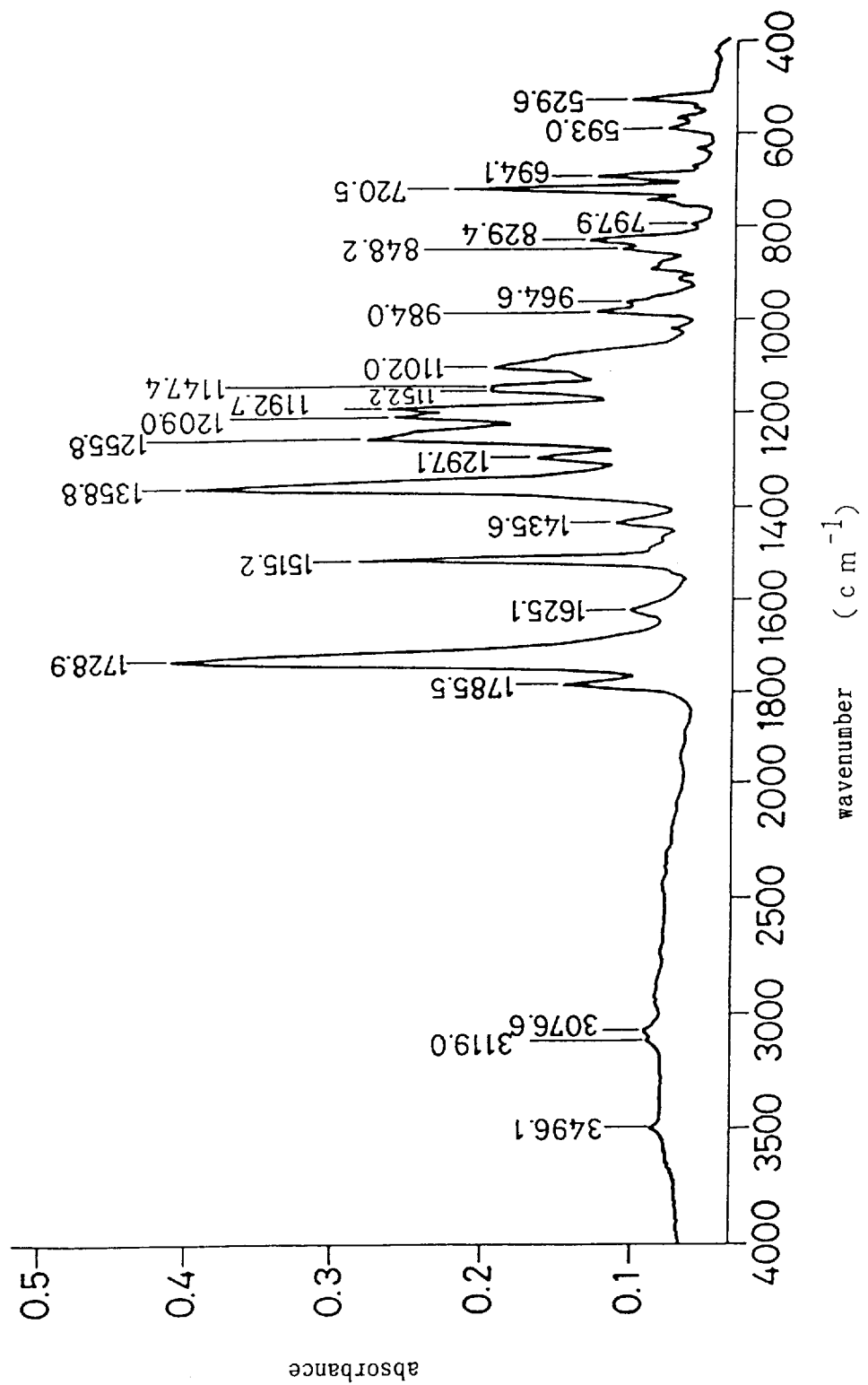
FIG. 1 is the infrared spectrum of the polyimide obtained in Example 1.
Figure 2:
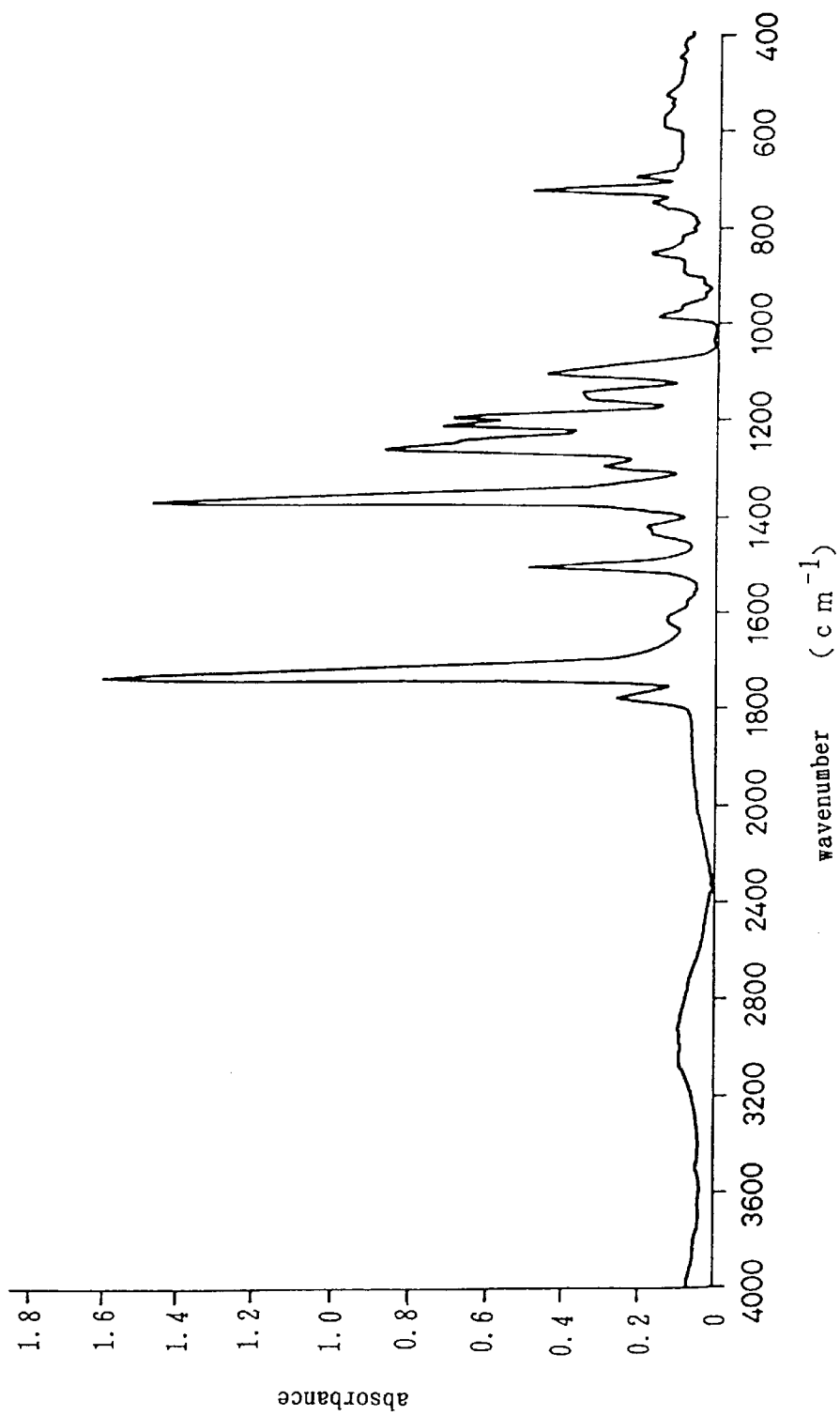
FIG. 2 is the infrared spectrum of the polyimide obtained in Example 3.

Aromatic polyimide was produced by adding 18.4 grams (41.4 mmol) of 4,4'-(hexafluoroisopropyridine) diphthalic acid dianhydride, 7.5 grams (41.4 mmol) of 1,4-phenylenediamine dihydrochloride, 80 ml of N-methyl-2-pyrrolidone and 20 ml of dichlorobenzene as solvent in a four neck flask having a capacity of 500 ml. A stirring motor, argon gas introduction tube, thermoelement to control temperature, Dean and Stark trap and reflex cooler were included. The vessel was heated to raise its temperature from room temperature to as high as 170° C., slowly, under argon atmosphere. The reaction time was five hours, during which time azeotropic dehydrating of the water generated at 170° C. occurred. After the reaction was completed, the vessel was cooled to room temperature, and the polymerization solution was diluted with N-methyl-2-pyrrolidone to be two times the original volume. The diluted polymerization solution was dropped, little by little, into 1000 ml of methanol solution and stirred at a high speed to cause precipitation of the polymer. The obtained solution was filtered to obtain the polymer, which was washed with excess of methanol twice; and dried at 80° C. The weight of the obtained polymer was 20.0 grams and the yielding ratio (percent yield) was 93.5%. The infrared spectrum of the obtained polymer was measured and the spectrum as shown in FIG. 1 was obtained. As a result of the analysis of the spectrum, it was confirmed that the obtained polyimide was the polyimide comprising a construction unit expressed by the following Chemical Formula 6. The intrinsic viscosity of the polyimide was 1.21 (dL/g). Intrinsic viscosity of the polyimide was measured with the 0.5(g/dL) N-methyl 2-pyrrolidone solution using Ubbelohde viscometer at 30° C.

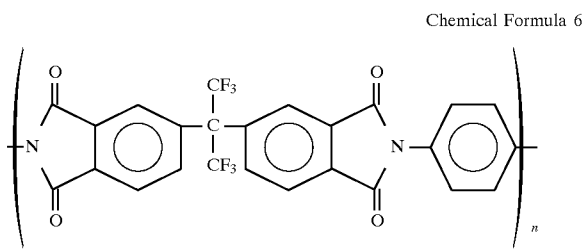

Chemical Formula 6

COMPARATIVE EXAMPLE 1

Conventional Chemical Synthesis of Polyimide

Aromatic polyimide was produced by adding 19.4 grams (179 mmol) of 1,4-phenylenediamine and 400 ml of NMP (N-methyl-2-pyrrolidone) as solvent in a four neck flask having a capacity of 1000 ml. A stirring motor, an argon gas introduction tube and an exhaust pipe were included. To the solution, 79.7 grams (179 mmol) of 4,4'-(hexafluoroisopropyridine) diphthalic acid dianhydride was slowly added, stirring at a room temperature for 24 hours to synthesize polyamic acid. After the polyamic acid was synthesized, 64.0 grams (627 mmol) of acetic anhydride and 49.6 grams (627 mmol) of pyridine as an imide reacting agent were added to the polyamic acid solution. The mixture was stirred to react at room temperature for 24 hours so as to cause an imide reaction. After the imide reaction was completed, the obtained polyimide solution was diluted with NMP to be two times the original volume. The diluted polyimide solution was dropped, little by little, into pure water, whose amount is ten times as that of the polymerization solution, while stirring at high speed so as to cause a reprecipitation. The obtained solution was filtered so as to obtain the polymer, which was washed with excess of methanol twice, and was dried at 80° C. The weight of the obtained polymer was 85.9 grams and the yielding ratio (percent yield) was 91.0%. The infrared spectrum of the obtained polymer was measured and the spectrum shown in FIG. 1 was obtained. As a result of the analysis of the spectrum, it was confirmed that the obtained polyimide was the polyimide comprising a construction unit expressed by the above Chemical Formula 6. The intrinsic viscosity of the polyimide was 0.53 (dL/g), as compared with that of the polyimide produced above by the method of the invention. (1.21 (dL/g))

EXAMPLE 2

Production of Polyimide From Diamine Dihydrochloride and Acid Anhydride

Aromatic polyimide was synthesized in the same manner as described above for Example 1 except that 7.5 grams (41.4 mmol) of 1,3-phenylenediamine dihydrochloride and 18.4 grams (41.4 mmol) of 4,4'-(hexafluoroisopropyridine) diphthalic acid dianhydride were used. It was confirmed by infrared spectroscopy that the obtained aromatic polyimide was that to be obtained, having the repeating unit shown in Chemical Formula 6. The amount of polyimide produced was 18.2 grams and the yielding ratio (percent yield) was 85.1%. The intrinsic viscosity of the polyimide was 0.81 (dL/g).

COMPARATIVE EXAMPLE

Conventional Chemical Synthesis of Polyimide

Aromatic polyimide was synthesized in the same manner as described above for Comparative Example 1, except that 19.6 grams (181 mmol) of 1,3-phenylenediamine and 80.5 grams (181 mmol) of 4,4'-(hexafluoroisopropyridine) diphthalic acid dianhydride were used. It was confirmed that the obtained aromatic polyimide was that to be obtained having the repeating unit shown in Chemical Formula 6. The amount of polyimide produced was 59.8 grams and the yielding ratio (percent yield) was 64.0%. The intrinsic viscosity of the polyimide was 0.25 (dL/g), as compared with 0.81 dl/g for polyimide produced by the method of the invention.

EXAMPLE 3

Production of Polyimide From Diaminotoluene Sulfate and Acid Anhydride

Aromatic polyimide was synthesized in the same manner as described above for Example 1 except that 7.5 grams (34.0 mmol) of 2,5-diaminotoluene sulfate and 15.1 grams of 4,4'-(hexafluoroisopropyridine)diphthalic acid dianhydride were used. The amount of polyimide produced was 16.9 grams and the yielding ratio (percent yield) was 87.8%. The infrared spectrum of the obtained polymer was measured and the spectrum shown in FIG. 3 was obtained. As a result of the analysis of the spectrum, it was confirmed that the obtained polyimide was the polymide comprising a construction unit shown in the following Chemical Formula 7. The intrinsic viscosity of the polyimide was 0.69 (dL/g).

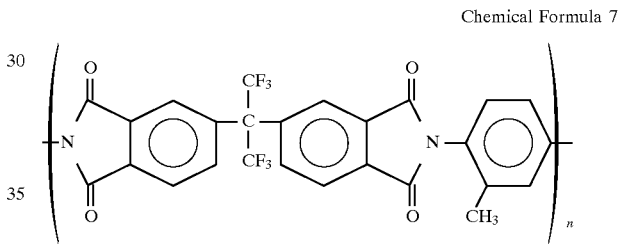

Chemical Formula 7

COMPARATIVE EXAMPLE 3

Production of Polyimide By Conventional Chemical Synthesis

Aromatic polyimide was synthesized in the same manner as described above for Comparative Example 1, except that 9.4 grams (76.9 mmol) of 2,5-diaminotoluene and 34.2 grams (76.9 mmol) of 4,4'-(hexafluoroisopropyridine) diphthalic acid dianhydride were used. The infrared spectrum of the obtained polymer was measured. As a result of the analysis of the spectrum, it was confirmed that the obtained polyimide was the polyimide comprising a construction unit shown in the above-mentioned Chemical Formula 7. The amount of the obtained polyimide was 34.8 grams and the yielding ratio (percent yield) was 85.1%. The intrinsic viscosity of the polyimide was 0.35 (dL/g), as compared with 0.69 dL/g for the polyimide produced by the method of the invention.

As mentioned in the examples and comparative examples, it was found that by using the method of the present invention. Aromatic polyimide can be synthesized in a shorter time than by conventional methods. The method of the invention comprises fewer steps in comparison with the conventional method. In addition, by using the producing method of the present invention, an aromatic polyimide having a higher polymerization degree and a higher intrinsic viscosity can be synthesized, in comparison with the conventional producing method.

This invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, an all change which come within the meaning and range of equivalency of the claims are intended to be embraced therein.

What is claimed is:

1. A method for producing aromatic polyimide comprising:

adding (a) a diamine dihydrochloride having the Chemical Formula 1:

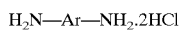  Chemical Formula 1 or a diamine sulfate having the Chemical Formula 2:

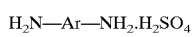  Chemical Formula 2 and (b) an acid dianhydride to form a mixture; and heating the mixture to dehydrate and condense the diamine dihydrochloride or sulfate with the acid anhydride to produce an aromatic polyimide having the Chemical Formula 3:

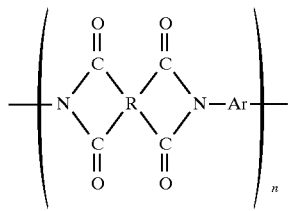  Chemical Formula 3 where Ar represents a divalent organic group having at least one aromatic ring, R represents a tetravalent organic group, and n represents a positive integer.

2. The method of claim 1, where said heating is to a temperature ranging from about 140° C. to about 200° C.

3. The method of claim 1, wherein said heating is to a temperature ranging from about 160° C. to about 170° C.

4. The method of claim 1, wherein said heating is for a time less than 24 hours.

5. The method of claim 1, wherein said heating is for a time ranging from about 3 hours to about 5 hours.

6. The method of claim 1, wherein said heating is for about 5 hours.

7. The method of claim 1, wherein said mixture further comprises a solvent.

8. The method of claim 7, wherein said solvent comprises N-methyl-2-pyrrolidone, N,N-dimethylformamide, N-,N-dimethylacetoamide, dimethylsulfoxide, hexamethylphosphoramide, or a mixture thereof.

9. The method of claim 8, wherein said solvent further comprises xylene, chlorobenzene, dichlorobenzene, trichlorobenzene, or a mixture thereof.

10. The method of claim 1, wherein said acid dianhydride comprises:

promellitic acid dianhydride, 4,4'-oxidoiphathalic acid dianhydride, 3,3',4,4'-biphenyltetra carboxylic acid dianhydride, 4,4'-(hexafluoroisopropylidene)diphthalic acid dianhydride, 3,3',4,4'-diphenylsulfonetetra carboxylic acid dianhydride, naphthalene-1,4,5,8-tetra carboxylic acid dianhydride, 3,4,9,10-perylenetetra carboxylic acid dianhydride, or a mixture thereof.

11. The method of claim 10, wherein the acid anhydride comprises:

4,4'-(hexafluoroisopropylidene)diphthalic acid dianhydride.

12. The method of claim 1, wherein said diamine hydrochloride comprises:

phenylenediamine dihydrochloride.

13. The method of claim 1, wherein said diamine hydrochloride comprises:

1,4-phenylenediamine dihydrochloride.

14. The method of claim 1, wherein said diamine hydrochloride comprises:

1,3-phenylenediamine dihydrochloride.

15. The method of claim 1, wherein said diamine sulfate comprises:

diaminotoluene sulfate.

16. The method of claim 1, wherein said diamine sulfate comprises:

2,5-diaminotoluene sulfate.

17. An aromatic polyimide produced by the process of claim 1, and having an intrinsic viscosity which is greater than the intrinsic viscosity of a corresponding aromatic polyimide produced by a two-step chemical or thermal imidation process, the intrinsic viscosity being measured using a 0.5 (g/dL) N-methyl-2-pyrrolidone solution with an Ubbelohde viscometer at 30° C.

18. The aromatic polyimide of claim 17, having an intrinsic viscosity of greater than 0.6 dL/g, measured using a 0.5 (g/dL) N-methyl-2-pyrrolidone solution with an Ubbelohde viscometer at 30° C.

19. An article of manufacture comprising an aromatic polyimide, which aromatic polyimide is produced by the method of claim 1.

* * * * *